US00RE44766E

(19) United States
(12) Reissued Patent
Naydenov et al.

(10) Patent Number: US RE44,766 E
(45) Date of Reissued Patent: Feb. 18, 2014

(54) X-RAY RADIOGRAPHIC METHOD OF RECOGNITION OF MATERIALS AND DEVICE FOR ITS REALIZATION

(75) Inventors: Sergei Vyacheslavovich Naydenov, Kharkov (UA); Boris Viktorovich Grynyov, Kharkov (UA); Volodymyr Diomydovych Ryzhikov, Kharkov (UA)

(73) Assignee: Institute of Scintillation Materials, National Academy of Sciences of Ukraine, Kharkov (UA)

(21) Appl. No.: 13/183,326

(22) Filed: Jul. 14, 2011

Related U.S. Patent Documents

Reissue of:
(64) Patent No.: 7,912,177
Issued: Mar. 22, 2011
Appl. No.: 12/462,968
Filed: Aug. 12, 2009

(30) Foreign Application Priority Data

Aug. 12, 2008 (UA) ..... 200810336

(51) Int. Cl.
*G03G 15/054* (2006.01)

(52) U.S. Cl.
USPC ..... 378/53; 378/207

(58) Field of Classification Search
USPC ..... 378/62, 207, 58, 97, 51–57, 98.12
See application file for complete search history.

(56) References Cited

U.S. PATENT DOCUMENTS 4,571,491 A 2/1986 Vinegar et al.
6,081,579 A 6/2000 Nagano et al.

(Continued)

FOREIGN PATENT DOCUMENTS

RU 2095795 11/1997
RU 2171980 8/2001

(Continued)

OTHER PUBLICATIONS

Grinyov et al., "Dual energy radiography of bone tissues using ZnSe-based scintielectronic detectors," Nuclear Instruments and Methods in Physics Research, A, 571 (2007) 399-403.
Harrison, "Digital radiography—a review of detector design," Nuclear Instruments and Methods in Physics Research, A 310 (1991) 24-34.

(Continued)

*Primary Examiner* — Hoon Song
(74) *Attorney, Agent, or Firm* — Kinney & Lange, P.A.

(57) ABSTRACT

An efficient X-ray radiographic method for recognition of materials of inspected objects and a corresponding device with improved functional possibilities are proposed, ensuring direct determination of the effective atomic number $Z_{eff}$ of the material, its density and thickness, as well as chemical composition. In customs inspection this should ensure practically unambiguous identification of explosives and drugs, and in medical tomography—early diagnostics of cancer tumors, osteoporosis, atherosclerosis and other dangerous and widespread diseases. The method includes X-raying of the inspected objects and recording of the transmitted radiation in several different spectral ranges with different effective energy by multi-element radiation receivers. For this purpose, quasimonochromatic X-ray radiation is used, and detection of radiation transmitted through the inspected object is made by spatially separated multi-element radiation receivers of selective sensitivity, upon each of which quasimonochromatic radiation of specified energy is directed. The background signal values in the absence of the inspected object are pre-recorded for each of said receiver elements under X-ray irradiation of specified energy, and signal values obtained in X-raying of a set of test objects are recorded. All the obtained signals are then normalized with respect to said background signals, and calibration constants are determined, after which the material is recognized by the obtained radiographic reflexes accounting for said calibration constants using special algorithms.

20 Claims, 1 Drawing Sheet

(56) References Cited

U.S. PATENT DOCUMENTS

| | | | | |
|---|---|---|---|---|
| 6,212,253 | B1 | 4/2001 | Schedel-Niedrig et al. | |
| 6,445,765 | B1 | 9/2002 | Frank et al. | |
| 6,816,572 | B2 | 11/2004 | Jabri et al. | |
| 7,020,241 | B2 | 3/2006 | Beneke et al. | |
| 7,134,786 | B2 | 11/2006 | Settergren et al. | |
| 7,190,757 | B2 | 3/2007 | Ying et al. | |
| 7,218,706 | B2 | 5/2007 | Hopkins et al. | |
| 7,236,559 | B2 | 6/2007 | Jha et al. | |
| 7,330,532 | B2 | 2/2008 | Winsor | |
| 7,912,177 | B2 * | 3/2011 | Naydenov et al. | 378/53 |
| 2007/0014471 | A1 | 1/2007 | Simonovsky et al. | |
| 2007/0025505 | A1 | 2/2007 | Bjorkholm | |
| 2007/0183568 | A1 | 8/2007 | Kang et al. | |
| 2008/0205594 | A1 | 8/2008 | Bjorkholm | |

FOREIGN PATENT DOCUMENTS

| | | | |
|---|---|---|---|
| SU | 1583806 | A1 | 7/1988 |
| SU | 1639272 | A1 | 6/1992 |
| UA | 44547 | | 2/2002 |
| UA | 80455 | U1 | 2/2009 |

OTHER PUBLICATIONS

Naydenov et al., "Detection of organic materials by spectrometric radiography method," Los Alamos Archives, http://arxiv.org/abs/0810.0583, printed Aug. 21, 2009.

Naydenov et al., "Direct reconstruction of the effective atomic number of materials by the method of multi-energy radiography," Nuclear Instruments and Methods in Physics Research, B, 215 (2004), 552-560.

Naydenov et al., "Multi-energy approach in radiography and introscopy," Nuclear Instruments and Methods in Physics Research, A, 537 (2005), 462-466.

Naydenov et al., "Multi-Energy Radiography Against Terrorism. Theory and Experiments," Los Alamos Archives, http//lanl.arxiv.org/abs/physics/0504170, visited Jun. 25, 2009.

Ryzhikov et al., "A spectrometric approach in radiography for detection of materials by their effective atomic number," Nuclear Instruments and Methods in Physics Research, A, 603 (2009), 349-354.

Ryzhikov et al., "Multi-energy radiography on the basis of 'scintillator=photodiode' detectors," Nuclear Instruments and Methods in Physics Research, A, 505 (2003), 549-551.

* cited by examiner

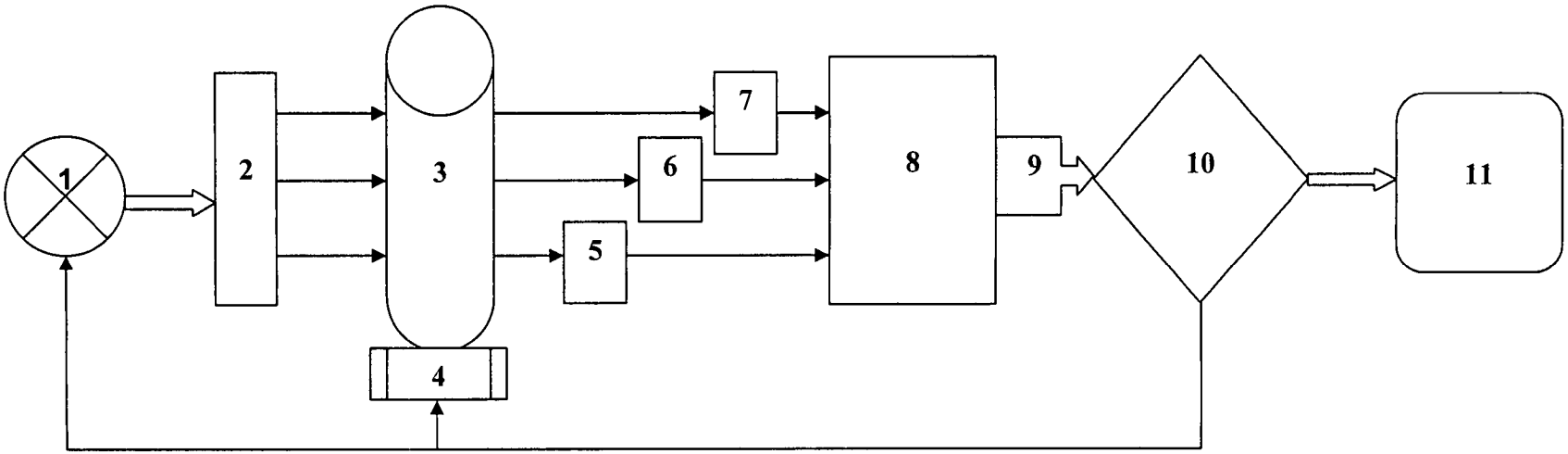
1
2
3
4
5
6
7
8
9
10
11

X-RAY RADIOGRAPHIC METHOD OF RECOGNITION OF MATERIALS AND DEVICE FOR ITS REALIZATION

Matter enclosed in heavy brackets [ ] appears in the original patent but forms no part of this reissue specification; matter printed in italics indicates the additions made by reissue.

BACKGROUND

The present invention relates to digital X-ray radiography and can be used in screening of baggage, hand luggage and other objects in the course of customs and security inspection, as well as in medical diagnostics of early stages of various diseases by separate visualization of different tissues and organs, including medical tomography.

The main task of customs inspection screening is reliable detection and recognition in luggage, cargos etc. of hidden materials and objects that are forbidden for transportation (drugs, poisons, explosives, inflammable substances; fissionable materials hidden inside radiation-proof containers; cold and fire arms, precious metals, various kinds of smuggled objects, etc.). An important task of modern medical radiography and tomography is reliable recognition of pathologies in various organs and tissues allowing diagnostics of dangerous diseases, especially at early stages (initial tumor formation on the background of healthy tissue, soft blood plaques in arteries at early stages of atherosclerosis, etc.).

An X-ray method of luggage content recognition is known [Bekeshko N. A., Kovalev A. V. Radiation systems of luggage inspection. Zarubezhnaya Elektronika, 1988, No. 6, p. 2.], comprising raying of luggage that is moved on a conveyor belt by a lateral fan-shaped beam of X-ray radiation, recording of radiation that passed through the inspected object by a receiver, storage of the recorded signals and their reproduction in the form of TV image of the inspected luggage and inclusions.

This method allows recognition of luggage inclusions by their shadow X-ray image, i.e., distinguishing inspected objects by radiographic density of their images. However, the substance type of which said inclusions are made is not determined. Therefore, this method cannot detect forbidden substances (e.g., drugs or explosives) and distinguish them from ordinary organic substances—tea, coffee, sugar, beverages, etc.

A method is known of radiographic recognition of materials inside inspected objects, in particular, inclusions of specified chemical composition [Invention certificate of USSR No. 1583806, G01N 23/04], which comprises X-raying of the object, recording of the transmitted radiation in two different spectral ranges with different effective energies by one and the same radiation receiver, and comparing the ratio of logarithms of the recorded signals to a pre-set threshold value for subsequent decision on the type of the detected substance, e.g., whether it is organic or inorganic.

The device for realization of this method comprises: an X-ray source, a block for scanning of the controlled object, a one-dimensional matrix radiation receiver (detector array), a multiplexer, an analog-to-digital converter with a normalizer at the output, a video memory, a control, memory and buffer memory blocks, a comparator, a logarithmator, a video control block, and a color encoding block. In this method, separation of the initial continuous radiation spectrum into two separate spectral ranges with different effective energy is realized by coordinated periodic variation of the anode voltage of the X-ray tube.

Calculating the logarithm ratio of signals received by each of the detectors of the one-dimensional matrix radiation receiver for different energies, a mass attenuation coefficient ratio is, in fact, roughly evaluated for the substance of the inspected object. This ratio depends upon the effective atomic number of the substance. Comparing it with a specified threshold level, decision can be taken on whether the substance belongs to organic ($Z<10$) or inorganic ($Z>20$) materials.

The main drawback of this method that it does not allow recognition of certain specified substances with effective atomic number $Z_{eff}$ among other substances with close values of $Z_{eff}$. E.g., a TNT-type explosive with $Z=7.15$ and a common soap with $Z=6.25$ would not be distinguished by this method. Also, emission of X-ray radiation in two different spectral ranges by switch-over of anode voltages on the X-ray tube and radiation recording by one detector array requires precise synchronizing of the source and detection system, which is a very difficult technical problem leading to even lower accuracy of $Z_{eff}$ determination.

Further practical experience of leading producers has shown another variant to be more promising—detection of X-ray radiation at fixed tube voltage by not one, but two detector arrays separated by a metal filter cutting off the energy ranges from each other. Each detector array is best suited for radiation detection in a separate energy range. As a whole, the assembly of low-energy detectors (LED) and high-energy detectors (HED) has a characteristic "sandwich" design [Harrison R. M. Digital radiography—a reviev of detector design. Nucl. Instr. and Meth., 1991, Vol. A 310, p. 24-34.].

A device for material recognition is known [U.S. Pat. No. 6,445,765, G01N 23/083, A61B 6/00], comprising an X-ray source and radiation receiver based on two (LED and HED) detector arrays. LED uses as scintillator a material in which at least one element has atomic number between 30 and 40, specifically, ZnSe(Te) crystal, and HED uses ceramics of material containing at least one element with atomic number above 60, specifically, $Gd_2O_2S$-type ceramics doped with Ce, Pr or Tb. LED thickness is 0.2-1.0 mm, HED thickness is 1-2 mm. LED is located, with respect to the X-ray source, before HED and is separated from it by a filter.

The use of ZnSe(Te) crystals as detecting elements of LED, as well as the relative position of LED and HED separated by a filter had been known before [Invention certificate of USSR No. 1639272, G01T 1/202; Patent of Ukraine No. 44547, G01T 1/202]. Due to the presence of two arrays of specially chosen detectors, which selectively detect radiation in the low-energy and high-energy ranges, accuracy of atomic number determination was substantially improved. Devices of this type have found wide practical application.

However, the accuracy of materials recognition remains not sufficiently high, which does not exceed 60-70% in the best variants of such devices (produced by Rapiscan, Smiths Heimann, NPO Kommunar, etc.). This may be sufficient for distinguishing between organics and inorganics or recognition of, say, cold or fire arms inside the luggage. But it is not sufficient for reliable recognition of explosives on the background of organics, for which the required accuracy should be about 90-95%.

Another method of X-ray material recognition by its effective atomic number [Patent of Russian Federation No. 2095795, G01N 23/04] comprises X-raying of the inspected object and recording of the transmitted radiation in spectral regions with different effective energy by two radiation receivers located one after another with a separating filter. Among the recorded signals, those are singled out that correspond to radiation passed only through the background substance in the inspected object and through both said background substance and the identified substance in the same object. Using signals of radiation absorption in two spectral regions by the background substance (for object parts where there is no identified substance), a calibration curve is chosen with each point corresponding to intensity values of signals of higher and lower effective radiation energy passed through the aggregate of the reference background substance (with signal values equivalent to the initial background substance of the inspected object) and the inspected substance of different thickness. Then signal values of the calibration curve are compared with selected recorded signals of radiation absorption by the aggregate of background and identified substances for the object. When the calibration curve contains signals equal to the recorded signals, it is judged that atomic numbers of the respective substances should be equal. Calibration curves are determined in advance at the same parameters of the emitter and receiver as in X-raying of the inspected object.

This method accounts for the spectral composition of radiation and the presence of a "typical" background substance. This eliminates some disadvantages of other detection methods of materials placed on the background of each other (so-called "multi-layered format") by introducing the effective atomic number of one of them. The term "background substance" means any substance or combination of substances on the background of which the identified substance is located. Authors of this method claim that it allows detection of forbidden substances (drugs, explosives, etc.) on the background of various materials inside inspected objects.

A device for its realization comprises: an X-ray emitter, means for movement of the inspected object, an X-ray radiation receiver composed of two detector arrays (for low and high energies, respectively) separated by a filter, random access memory, an analog to digital converter, a video monitoring device, registers, an address generator, read-only memory, a comparison circuit, a marker signal shaper, control buttons, and signaling means.

Disadvantages of this method, as of all the other prior art, consist in impossibility to distinguish accurately and reliably among detected substances with close values of atomic number and density, since the proposed calibration curves will be practically identical.

A general drawback of the known solutions using LED and HED is identification ambiguity of explosives and drugs on the background of other organic materials. The reason for this lies in broad diffuse spectra of X-ray emitters, leading to the high-energy spectral range being partially recorded by LED, and the low-energy range—by HED. Another drawback is relatively slow response of ZnSe(Te) crystals. At low afterglow level, their decay time is more than 100 μs. This imposes limitations upon the full number of channels (up to 800 elements in the receiving system) and, respectively, on the minimum pixel size, i.e., on the spatial resolution of the system. Therefore, crystals with such decay time are not suitable for medical tomography.

In the above-described analogs, substance recognition by its atomic number uses a known dependence of the X-ray absorption coefficient on $Z_{eff}$, which is different in different ranges of the radiation energy spectrum. In the working range of inspection scanners and medical tomographs (commonly used tube voltage up to 160 kV, i.e., radiation energy 100-110 keV), predominant absorption mechanisms involve photoeffect and Compton scattering, with absorption coefficient proportional to $Z_{eff}$ raised to 3rd-5th power in the case of photoeffect. The same law applies also to absorption in the scintillator material. This necessarily makes LED partially sensitive to high energies, and, inversely, HED show some sensitivity to low energies. When both detectors are placed one after another (in a row), with a broad emitter spectrum, this interference is rather strong, which necessarily lowers the measurement accuracy. As a result, the detection probability for, e.g., explosives on the background of safe organics, does not exceed 60-70%.

For efficient recognition of materials with similar character of radiation absorption, i.e., with close values of effective atomic number and density, an important factor, alongside with higher accuracy, is a possibility of simultaneous quantitative reconstruction of several controlled parameters. These parameters, determined by physio-chemical composition of the inspected material, include effective atomic number, density, and partial composition (concentration) of simple elements (e.g., carbon, nitrogen and oxygen in the problem of detection of explosives) or simple components for a material that is a complex chemical substance or a mixture (alloy, suspension) of substances.

For full reconstruction of these parameters, quantitative methods are needed that would not be based on the widely used principle of comparing the detected signals to data bases obtained in advance by screening of a large set of reference materials. Also, the direct X-raying methods are to account for requirement of nearly ideal separation of two or more detected energies, which is very difficult to achieve in a standard "sandwich" design of detector arrays.

The last of the above-described analogs has been chosen as prototype.

SUMMARY

The present invention, in one aspect, is a method of materials recognition, comprising their X-raying and detection of the transmitted radiation in several different spectral ranges with different effective energy by multi-element radiation receivers. The method, according to a particular aspect of the present invention, involves quasimonochromatic X-ray radiation, detection of radiation transmitted through the inspected object being made by spatially separated multi-element radiation receivers of selective sensitivity, upon each of which quasimonochromatic radiation of specified energy is directed. The background signal values in the absence of the inspected object are preliminarily recorded for each of said receiver elements under X-ray irradiation of specified energy, and signal values obtained in X-raying of a set of test objects are recorded. All the obtained signals are then normalized with respect to said background signals, and calibration constants are determined, after which the material is recognized by the obtained radiographic reflexes accounting for said calibration constants.

Another aspect of the present invention is a device for X-ray radiography recognition of materials comprising an X-ray emitter, means for movement of the inspected object, an X-ray radiation receiver made of selectively sensitive detector arrays, random access memory, analog-to-digital converters, and a video monitoring device. According to a particular aspect of the present invention, said X-ray emitter is equipped by not less than two monochromatic filters, and said receiver comprises not less than two spatially separated selectively sensitive detector arrays with outputs connected to a joint analog-to-digital converter with a logarithmator output connected to a computer interface with appropriate software.

In one embodiment, detectors of selectively sensitive arrays for the energy range up to 20 keV are made of scintillators with effective atomic number below 25 and density less than 2.5 g/cm$^3$, for the energy range 20-45 keV—with atomic number 25-45 and density 3-6 g/cm$^3$, and for the energy range 45-200 keV the detectors are made of scintillators with atomic number 45-80 and density 6 g/cm$^3$ and more. For detectors of all arrays, thickness is optimized for absorption of 70-90% of the incident radiation.

BRIEF DESCRIPTION OF THE DRAWINGS

FIG. 1 is a schematic diagram of a device for realization of an X-ray radiographic method of recognition of materials according to an embodiment of the present invention.

DETAILED DESCRIPTION

The purpose of the present invention is to provide a more efficient X-ray radiography method of materials recognition in the inspected objects and an appropriate device for its realization with broadened functional possibilities, namely, ensuring direct determination of the effective atomic number $Z_{eff}$, density and thickness, as well as chemical composition of the material. In customs inspection, this should allow practically unambiguous identification of explosives and drugs, and in medical tomography—early diagnostics of cancer tumors, osteoporosis, atherosclerosis and other dangerous diseases.

For this purpose, the proposed method of materials recognition, comprising their X-raying and detection of the transmitted radiation in several different spectral ranges with different effective energy by multi-element radiation receivers, according to the present invention, involves quasimonochromatic X-ray radiation, detection of radiation transmitted through the inspected object is made by spatially separated multi-element radiation receivers of selective sensitivity, upon each of which quasimonochromatic radiation of specified energy is directed; the background signal values in the absence of the inspected object are preliminarily recorded for each of said receiver elements under X-ray irradiation of specified energy, and signal values obtained in X-raying of a set of test objects are recorded, all the obtained signals are then normalized with respect to said background signals, calibration constants are determined, after which the material is recognized by the obtained radiographic reflexes accounting for said calibration constants.

In the device for X-ray radiography recognition of materials comprising an X-ray emitter, means for movement of the inspected object, X-ray radiation receiver made of selectively sensitive detector arrays, random access memory, analog-to-digit converters, video monitoring device, according to the present invention, said X-ray emitter is equipped by not less than two monochromatic filters, said receiver comprises not less than two spatially separated selectively sensitive detector arrays with outputs connected to a joint analog-to-digit converter with logarithmator output connected to a computer interface with appropriate software.

Detectors of selectively sensitive arrays for the energy range up to 20 keV are made of scintillators with effective atomic number below 25 and density less than 2.5 g/cm$^3$, for the energy range 20-45 keV—with atomic number 25-45 and density 3-6 g/cm$^3$, and for the energy range 45-200 keV the detectors are made of scintillators with atomic number 45-80 and density 6 g/cm$^3$ and more. For detectors of all arrays, thickness is optimized for absorption of 70-90% of the incident radiation.

The mentioned test objects are several specially chosen objects composed of simple or multi-component substances with their atomic numbers, density, thickness and chemical composition known in advance.

The calibration constants are a set of numerical parameters calculated on the basis of data obtained in X-raying of the test objects, which are then used in algorithms for reconstruction of chemical composition proposed in the present invention.

The radiographic reflex is a special auxiliary value $R_i=-\ln[I(E_i)/I_O(E_i)]$, which is expressed using the signal in the absence of object (normalized with respect to the background value) $I_O$ $(E_i)$ and the output signal I $(E_i)$ obtained from individual detectors selectively tuned for separate recording of different energies. The sets of values $Z_j$ and $\Delta_j$ (density multiplied by the object thickness), as well as chemical composition (mass or molar fraction of specified chemical elements or simple substances) play finally the role of determinative parameters of the material of the inspected object.

The essence of the proposed method and the corresponding device for determination of atomic number, density, chemical composition and thickness of inspected objects is the use of multi-monochromatic radiation from the side of X-ray emitter in combination with selective multi-energy recording of X-ray radiation from the side of receiving-detecting system, and subsequent use of special algorithms for unambiguous reconstruction of several controlled parameters for the material of an inspected object and their graphical visualization (on the real time scale after computer processing of the arrays of reconstructed data). Experiments show that the number of reconstructed parameters corresponds to the order of multi-energeticity, i.e., the number of energy values used in multi-energy radiography. As distinct from other variants of digital radiography, in the proposed method these parameters are determined directly, and not indirectly evaluated (method of basic materials) or estimated from comparative analysis. A characteristic feature of the proposed method is the use of a small number (from two to four) of specially selected narrow quasimonochromatic radiation energy ranges and their recording by spatially separated radiation receivers of selective energy sensitivity operating in a standard mode.

This physical feature allows substantial simplification of the data processing procedures. A complex analytical method of integral solution of accompanying inverse problems can be replaced by a suitable linear solution, which, with an appropriate choice of radiation receivers, is unambiguous, excluding various mistakes and ensuring more accurate reconstruction of parameters of the inspected object.

For this solution, it is important that each quasimonochromatic beam falls only onto a specified matched detector array, which is ensured by appropriate positional relationship of the emitters and receivers. This a priori excludes any interference of radiation of different energies upon signals recorded by different detector arrays.

The amplitude attenuation of X-ray radiation along the object thickness is described by the exponential law. This allows us to write down a general equation describing the multi-energy radiography (MER):

$$I(E)=I_O\int K(E, E')\exp[-\mu_m(E')\Delta]dE', \quad (1)$$

where I (E) is the intensity of the signal recorded by detectors (expressed in appropriate convenient energy units) at energy E of radiation transmitted through the object and energy E' of incident radiation (coming onto the object from the source); $I_O$ is full (integrated over the spectrum) intensity of the emitter; K (E, E') is the kernel of integral operator, the explicit form of which depends on multiple factors related to the inverse problem, including geometry of the system, spectrum of the X-ray emitter, peculiar features of interaction between radiation and material of the object (including scattered radiation factors), form of the instrument function (unit response) of the detectors, energy characteristics of scintillators, etc. The mass coefficient $\mu_m=\mu/\rho$ of radiation absorption depends both on radiation energy and on atomic and/or chemical composition of the inspected material, in particular, on its $Z_{eff}$. The value $\Delta=\rho l$ (as distinct from the commonly used volume density $\rho$) denotes surface density of the material, which determines the average density of the object with respect to its unit surface in the direction of X-raying; this value depends not only on the substance, but also on the local thickness l of the object.

In a shortened form, the equation (1) can be transformed into an integral equation Af=g (here A is the operator of measurement or signal recording) with respect to unknown function f with specified function g, which is determined by the measurement results. The unknown f is related to the substantional structure parameters to be reconstructed. Solution of equations of this type leads, as a rule, to so-called incorrect problems (in the mathematical sense). This is reflected in small variations of the known function g resulting in substantial changes in function f. Physically, this corresponds to the appearance of large errors and substantial decrease in accuracy of materials recognition using MER. Small deviations of signals recorded by the detectors, e.g., due to always present fluctuations and noises, substantially distort the material recognition results and lead to the often observed artifacts in radiographic images. Also, a solution of such problem is not necessarily unique. As a result, the probability of errors in separate recognition of materials similar in their absorption characteristics greatly increases—e.g., in looking for explosives on the background of organics, in detection of soft blood plaques on the background of blood vessels, etc.

Solution of the inverse problem is substantially simplified by a special choice of kernel K (E, E') as a linear combination of delta-functions $$K(E, E') = \sum_{i=1}^{M} g_i \delta(E' - E_i)\delta(E - E'); \sum_{i=1}^{M} g_i = 1, \tag{2}$$

where natural M=1, 2, . . . correspond to the order of multi-energeticity. Physically such approximation corresponds to the use of quasimonochromatic filtration of the source radiation and neglecting the effects of energy scattering. If this is additionally accompanied by selective recording of the transmitted radiation at spectrally separated energies $E=E_i$, the problem is reduced to the linear system $$\sum_{j=1}^{N} \left[\alpha(E_i)Z_j^{p+1} + \beta(E_i)Z_j\right]\Delta_j = R_i; \tag{3}$$

$$i = 1, \ldots M, \; j = 1, \ldots N,$$

where a special model is introduced for description of local attenuation coefficient. It presupposes that radiation absorption at specified energies in different energy ranges should occur over two channels with different functional dependence upon effective atomic number. E.g., in the energy region up to several hundred keV the relevant mechanisms are photoeffect and Compton scattering, while in the MeV region the Compton effect and pair formation are involved. Naturally, this condition imposes certain limitations upon optimum choice of energies. The $\alpha(E)$ and $\beta(E)$ values determine the energy dependence of the predominant absorption mechanisms, with $\beta$ always corresponding to the Compton effect. Their explicit form is, in practice, not essential, because $\alpha_i=\alpha(E_i)$ and $\beta_i=\beta(E_i)$ can be expressed in terms of the calibration constants, which, in turn, are related to measurement data obtained on test objects of known composition and geometry, i.e., to correct calibration of the detection system. As $Z_j$, one can choose either the effective atomic number of the material $Z_{eff}$ (then N=1, and index j assumes only one value j=1, which corresponds to the most simple model of one-layer and one-component material), or the atomic number of partial components of the object in the direction of X-raying; account for them can correspond to a multi-layered object or to an object made of material with complex multi-component chemical composition. The value of p is assumed as p=3 in the case of photoeffect and p=1 for the pair formation. This corresponds to an ideal theoretical model of radiation scattering on hydrogen-like atoms. In a more general case, p should be considered as fitting parameter, and its value should be optimized for each specific case using statistical methods. The values $\Delta_j=\rho j\, lj\, aj$, where $a_i$ is the relative content of the j-th partial component and $\Sigma j\ a_{1-1}$ (corresponding to $a_j-1$ in describing a multi-layered format), determine the surface density of individual components of a complex or composite object in the X-raying direction.

In recognition algorithms, the principal role is played not by an ordinary recorded signal, but a value derived from it—a radiographic reflex. As noted above, this value $R_i=\ln[I(E_i)/I_O(E_i)]$ is expressed by the logarithm of the output signal $I(E_i)$ (obtained by detectors selectively adjusted for separate recording of different energies), normalized with respect to the background value $I_O(E_i)$ (signal without an object). The sets of values $Z_i$ and $\Delta_j$ are, finally, the controlling parameters of the material of the inspected object. To make the inverse problem fully defined, it is necessary that M>N. In the case of one-layer or homogeneous object, its solution will be unambiguous upon condition M=2N, i.e., the number of recorded energies should be equal to the number of simple components (layers) multiplied by two. For identification of a multi-layer format, the order of multi-energeticity should be even higher. E.g., inspection of a two-layered object containing only two simple materials requires 4-energy MER.

In the case of two-energy radiography, we obtain $$\begin{cases} (\alpha_1 Z_{eff}^{p+1} + \beta_1 Z_{eff})\Delta = R_1 \\ (\alpha_2 Z_{eff}^{p+1} + \beta_2 Z_{eff})\Delta = R_2 \end{cases} \Rightarrow \begin{cases} Z_{eff} = \varphi(R_1, R_2; \{R_{1,2}^{(1)}, R_{1,2}^{(2)}\}) \\ \rho l = \psi(R_1, R_2; \{R_{1,2}^{(1)}, R_{1,2}^{(2)}\}) \end{cases} \tag{4}$$

with solution determined by functions $\underline{\phi}$ and $\underline{\psi}$, depending upon data $\{R_{1,2}^{(1)}, R_{1,2}^{(2)}\}$ of calibration measurements on two test objects of known composition and geometry. From the previous equation system, a formula for determination of the effective number follows:

$$Z_{eff} = Z_{eff}(\overline{R}) = \left[\frac{a\overline{R} + b}{c\overline{R} + d}\right]^{1/p}; \overline{R} = \frac{R_1}{R_2}, \tag{5}$$

so, in the proposed method of material recognition it depends not separately on two radiographic reflexes obtained at different energies, but on their ratio. The calibration parameters {a, b, c, d} are calculated from relationships of $a=a(\overline{R}_1, \overline{R}_2,$ $\overline{R}_3$; $Z_1$, $Z_2$, $Z_3$) type, which are also obtained from the said equation system, in which known calibration data $\overline{R}_j=R_1^{(j)}/R_2^{(j)}$, j=1, 2,3 are present and parameters $Z_j$ for three test materials are specified. As distinct from the general case of calibration, thickness and shape of test objects can in this case be arbitrary. If X-ray devices used for inspection or medicine do not exceed energies of several hundred keV, parameter p should be taken as p=3. For MeV-range devices, it should be p=1. A straightforward calculation shows that determination of $Z_{eff}$ the following natural condition should be met $$Z_1 \neq Z_2;\ Z_2 \neq Z_3;\ Z_1 \neq Z_3. \tag{6}$$

Calibration parameters should be determined in such a way that parameters of materials for test objects should differ from one another not less than required differences to be detected in the inspected objects. In practice, test objects should have values of $Z_{eff}$ in the middle and at edges of the spectrum of expected $Z_{eff}$ values for substances to be identified. E.g., for separation of inorganics from organics using MER, test object materials can 13be chosen as wood $Z_1=6$ (low $Z_{eff}$), aluminum $Z_1=6$ (medium $Z_{eff}$) and iron $Z_1=26$ (high $Z_{eff}$). For recognition of organics, materials with closer $Z_j$ should be taken—in the range from 4 to 8. If necessary, it is possible to carry out not one, but several computer procedures on the real time scale, which would allow more accurate determination of $Z_{eff}$ by consecutive narrowing of the range of pre-set $Z_j$ values of test objects with subsequent optimization of the choice of corresponding functional dependences of effective atomic number on the radiographic reflex.

The obtained solution leads also to an exact expression for spatial density $\Delta=\Delta$ ($R_1$, $R_2$; A, B, C, D), which is expressed in terms of both radiographic reflexes $R_1$ and $R_2$, as well as another set of calibration parameters {A, B, C, D} for determination of density. This value is an additional controlling parameter of the material. Using modern calculation means, the values $Z_{eff}$ and $\Delta$ can be reconstructed simultaneously, obtaining to each pair of values ($R_1$, $R_2$) for the inspected object a corresponding pair ($Z_{eff}$, $\Delta$) for the material of this object. The obtained pair of parameters ($Z_{eff}$, $\Delta$) can be conveniently used for more accurate identification of materials with similar character of absorption.

Moreover, the appropriate calculations show that under conditions of multi-monochromatic separation and energy recording it is possible to obtain, starting from equation systems like presented above, exact expressions for reconstruction of partial composition of simple chemical components for a material of complex chemical composition. E.g., in recognition of explosives one can obtain expressions for the relative content of nitrogen and oxygen or larger number of simple elements (chemical components). The number of controlled components corresponds to the order of multi-energeticity. In the case of two-energy MER, the relative concentrations $c_{X,Y}=c_{X,Y}(R_1, R_2; c_1, c_2, c_3, c_4)$ (under condition $c_X+c_Y=1$) of two identified elements X, Y are expressed in terms of corresponding functional dependences with a new set $\{c_1, c_2, c_3, c_4\}$ of calibration parameters intended for the algorithm for reconstruction of chemical composition. The test objects may remain the same, but calibration parameters are calculated differently for each algorithm of material recognition.

Summing up, under conditions of multi-monochromaticity all the controlled parameters of the material can be determined using the above-described algorithms. Obtaining and reconstruction of this information and its visualization in a convenient form are realized by an appropriate device.

Schematic design of the device for realization of the proposed method is shown in FIG. 1.

The device comprises the X-ray radiation source 1, equipped by not less than two multi-monochromatic filters 2, e.g., of type developed by MXF Inc. [U.S. Pat. No. 6,445,765, G01 T23/083], which single out two or more fan-shaped planar radiation beams with minimum energy scatter close to monochromatic. The unit 3 ensures movement of the inspected object 4, behind which not less than two selectively sensitive detector arrays 5-7 are placed. The detector outputs are connected to the input of the analog-to-digit converter 8, and the output of its logarithmator 9 is connected to the input of the computer interface 10, with its output connected to the video control device 11 and, via feedback, with the radiation source 1 and the object movement unit 3.

The detectors of selectively sensitive arrays for the energy range up to 20 keV are made of scintillators with effective atomic number below 25 and density less than 2.5 g/cm$^3$, for the energy range 20-45 keV—with atomic number 25-45 and density 3-6 g/cm$^3$, and for the energy range 45-200 keV the detectors are made of scintillators with atomic number 45-80 and density 6 g/cm$^3$ and higher.

In particular, detectors of selectively sensitive arrays for the lower energy range can be made of stilbene, p-terphenyl, silicon, germanium, ZnSe, ZnSe(Al,O), ZnSe(O); detectors of the medium energy range can be made of $A^2B^6$ compounds CdS(Te), ZnSe(Te,O), transparent ceramics $Gd_2O_2S$, ZnS, etc.; detectors of high-energy range can be made of crystals CdTe, CsI(Tl), CWO, BGO, LSO, LPS. The detector thickness of each array is optimized for absorption of 70-90% of the incident radiation.

In a specific embodiment, the detector arrays for low energy range are made of crystal ZnSe(Al,O) of thickness up to 0.5 mm, for the medium energy range—of crystal ZnSe (Te) of thickness up to 1.2 mm, and the high energy range—of crystal CsI(Tl) of thickness up to 2 mm.

The computer interface 10 comprises controllers and a data transfer bus (USB, LAN, FireWire or Wireless, or any combination of these) between the computing unit (industrial computer, work or graphic station, personal or mobile computer or cluster of computers) and other instrument components of the device (emitter, receiver, movement unit, monitors, etc.); means of visualization, manual or automatic control and/or signaling, as well as various peripheral units (monitors, netcard or modem for connection with local and global network, printer, digital data storage, etc.). The computing unit also comprises random access and read-only memory devices where all digital data are stored and processed, central and graphic processor ensuring calculations and visualization of the digital data obtained. The operation of the equipment components and the device as a whole is controlled by the said computer interface using specially designed software.

The video control device 11 may comprise other peripheral units, including the data storage system connected to local and global network, as well as an automatic decision-making and signaling/alarm system.

The high stability X-ray radiation source 1 is located in the horizontal or vertical plane, creating a diverging beam of X-ray radiation. The monochromatic filters 2 single out several (not less than two) planar fan-shaped beams of quasimonochromatic spectral composition from the continuous spectrum of X-ray radiation. The filters and spatially separated radiation receivers are positioned in such a way as to ensure incidence of a planar-parallel fan-shaped beam of one specified energy onto each of the detector arrays. Each of the energy ranges of the beams is characterized by a fixed value of the carrier energy and small controlled scatter around it. The unit 3 ensures spatial displacement of the inspected object 4 for its scanning in conditions of different geometries (scanning on a horizontally moving conveyor in one or several planes, spiral scanning with simultaneous rotation and vertical movement, etc.). The X-ray emitter 1 and object movement unit 3 are controlled through the computer interface 10.

Before the operation is started, test objects made from known materials of different chemical composition and thickness (e.g., wood, plastic, aluminum, iron, lead, etc.) are chosen, which are used for preliminary X-raying and adjustment of system operation. Then data bases are formed, and calibration parameters are determined, which are further used in computer processing of the recorded signals using special algorithms for direct reconstruction of physico-chemical parameters of the inspected objects.

The multi-monochromatic ionizing radiation transmitted through the inspected object 4 is recorded by the detection system comprising several (not less than two) spatially separated detector arrays 5-7 of "scintillator-photodiode" type. The required spatial separation of the detector arrays can be ensured, e.g., by placement of one array above the other (horizontal X-raying direction) or one array at the side of the other (vertical X-raying direction), with their adjustment to the fan-shaped planar beams of quasi-monochromatic radiation from the source. Each of the arrays comprises a set of single-channel detectors (from 128 to 1024 detectors in each array), the detectors being of the same type with minimum scatter of their parameters. Detectors are designed for the most efficient selective recording of low—5, medium—6 and/or high-energy 7 components of the radiation. Electrical signals coming from the photodiodes of detectors 5-7 pass through the analog-to-digit converter 8, where they are amplified, appropriately modified in the logarithmator 9 and digitalized. Signals from all detectors of all arrays are processed simultaneously. After processing in the unit 8, the digitalized multi-monochromatic signals come on the real time scale to the computer interface 10 for their further processing using appropriate algorithms and specially designed software. A characteristic feature of the algorithms is direct determination of the controlling parameters for inspected materials from the set of multi-energy signals, and not comparative analysis of these signals to data arrays imitating the presence of certain materials of certain thickness on the background of other specified materials of different thickness. Unambiguity of the reconstruction of effective atomic number and other controlling parameters is guaranteed both by appropriate choice of specially processed signals (transition from simple signals to reflexes) and by appropriate choice of algorithms for recognition of specified material parameters, accounting for quantity and chosen values of characteristic energies and absorption mechanisms.

At the final stage, physio -chemical parameters of the material of the inspected object are reconstructed by computer processing of the data obtained. According to the color palette chosen in advance, which imitates the presence of a material with specified parameters inside the inspected object, the video control device 11 visualizes separate images of the object with separate visual presentation of physical components (materials) of the object structure having different effective atomic number, density, chemical composition according to the above-described algorithms. The procedure of "unveiling" the object can be realized either discretely (rough detection of materials for several images of the object with fixed values of controlling parameters), or continuously (accurate detection with smooth transition from one identified material to another). In particular, in the case of 2-energy radiography, the monitor(s) of the unit 11 will show a reconstructed image of the object with local spatial distribution inside it of components with low atomic number (e.g., detection of a specified organic substance by a customs scanner or of a biological soft tissue by a medical scanner) and components with high atomic number (detection of an inorganic compound or a solid bone tissue, respectively). It is natural to introduce a correspondence between the effective atomic number value and a certain specified color from the palette (e.g., the palette from red to violet can correspond to the increase in atomic number upon transition from organics to inorganics), and the simultaneously calculated surface density of the object material can be represented by the intensity of the respective color. Then the monitor of the video control device will demonstrate a visual image of the internal content of the object with direct recognition of the materials.

The proposed method uses, instead of ordinary signal, the radiographic reflex as an important parameter for data processing. The relationship of this parameter with $Z_{eff}$, calculation of the corresponding calibration constants and introduction of all analytical data into specially developed software for processing of multi-energy signals and separate visualization of spatial regions of the object having different chemical composition (according to the reconstructed controlling parameters of the object materials), taking into account the quasimonochromaticity of the X-ray system, allows substantial improvement of the inspection quality. In particular, the performed analysis shows that the accuracy of $Z_{eff}$ reconstruction using the proposed method can be estimated as $$\frac{\delta Z}{Z} \propto N\left(\frac{\delta l}{l}\right), \tag{7}$$

where $\delta Z$ determines the characteristic uncertainty in reconstruction of $Z_{eff}$, N is the order of multi-energeticity, and $\delta l/l$ is spatial resolution of the detecting system. In principle, $Z_{eff}$ can be determined with accuracy up to 95-97%, if the spatial resolution of the system (using two-energy MER) is about 2-5 line pairs per mm. In fact, the accuracy is limited by internal noises of the electronics, instability of radiation source and some other factors that are not related with the error of the method itself. For comparison, according to our estimates, the accuracy of $Z_{eff}$ determination for similar objects using the mentioned analogs does not exceed 60-70%.

It should be noted that the proposed solution can ensure the development of a new type of multi-energy X-ray inspection scanner for custom service and industry, as well as a computer-based multi-energy tomograph ensuring recognition of pathologies with accuracy and reliability not inferior to positronic emission tomography.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An X-ray radiographic method of recognition of materials in an inspected object, comprising:

transmitting radiation through the inspected object in a plurality of different spectral ranges with different effective energy, wherein X-ray radiation used is quasimonochromatic, recording said radiation transmitted through the inspected object by spatially separated multi-element radiation receivers of selective sensitivity, upon each of which quasimonochromatic radiation of specified energy is directed, and recognizing the materials in the inspect*ed* object, according to the following method:

pre-recording background signal values in the absence of the inspected object for each of said receivers under X-ray irradiation of specified energy, recording signal values obtained in X-raying of a set of test objects, normalizing the [signals are normalized] signal values obtained in X-raying the set of test objects with respect to said background signals to determine calibration constants, and recognizing the material by determining a radiographic reflex for the inspected object based on the recorded radiation normalized with respect to said background signals, and accounting for said calibration constants.

2. The X-ray radiographic method of recognition of materials of claim 1, wherein the X-ray radiation used comprises a plurality of beams of narrow quasimonochromatic radiation energy ranges, and each beam falls only onto a specified one of the radiation receivers.

3. The X-ray radiographic method of recognition of materials of claim 1, wherein relative concentrations of N materials in the inspected object are determined by employing at least M beams of narrow quasimonochromatic radiation energy ranges and by calculating separate calibration parameters for separate algorithms of material recognition for each material to be recognized, with M being equal to N.

4. The X-ray radiographic method of recognition of materials of claim 2, wherein the X-ray radiation used comprises a number of beams of narrow quasimonochromatic radiation energy ranges that is equal to twice the number of layers of the inspected object.

5. The X-ray radiographic method of recognition of materials of claim 4, wherein when the inspected object is homogeneous, the effective atomic number ($Z_{eff}$) of the inspected object is defined by the following equation:

$$Z_{eff} = Z_{eff}(\overline{R}) = \left[\frac{a\overline{R} + b}{c\overline{R} + d}\right]^{1/p}; \overline{R} = \frac{R_1}{R_2},$$

where $R_1$ is the radiographic reflex obtained at a first radiation energy range, $R_2$ is the radiographic reflex obtained at a second radiation energy range, a, b, c and d are the calibration constants determined by normalization of signal values obtained in X-raying the set of test objects, and p is a fitting parameter based on a level of the radiation energy ranges employed.

6. The X-ray radiographic method of recognition of materials of claim 5, wherein p is taken as 3 for radiation energy ranges less than 1 megaelectronvolt (MeV), and p is taken as 1 for radiation energy ranges greater than 1 MeV.

7. The X-ray radiographic method of recognition of materials of claim 1, wherein the set of test objects is chosen to include test objects having effective atomic numbers in the middle and at edges of a spectrum of expected effective atomic number values for the materials to be identified by the X-ray radiographic method.

8. The X-ray radiographic method of recognition of materials of claim 7, wherein the materials to be identified by the X-ray radiographic method involve separation of inorganics from organics.

9. The X-ray radiographic method of recognition of materials of claim 8, wherein the set of test objects includes wood as a low effective atomic number object, aluminum as a medium effective atomic number object, and iron as a high effective atomic number object.

10. The X-ray radiographic method of recognition of materials of claim 7, wherein the materials to be identified by the X-ray radiographic method involve recognition of organics.

11. The X-ray radiographic method of recognition of materials of claim 10, wherein the set of test objects includes multiple objects having effective atomic numbers in the range of 4 to 8.

12. The X-ray radiographic method of recognition of materials of claim 1, wherein an effective atomic number and a spatial density of the inspected object are obtained in order to recognize the materials therein.

*13. An X-ray radiographic apparatus for recognition of materials in an inspected object, comprising:*

*means for transmitting radiation through the inspected object in a plurality of different spectral ranges with different effective energy, wherein X-ray radiation used is quasimonochromatic,*

*means for recording said radiation transmitted through the inspected object by spatially separated multi-element radiation receivers of selective sensitivity, upon each of which quasimonochromatic radiation of specified energy is directed, and*

*means for recognizing the materials in the inspected object, including:*

*means for pre-recording background signal values in the absence of the inspected object for each of said receivers under X-ray irradiation of specified energy,*

*means for recording signal values obtained in X-raying of a set of test objects,*

*means for normalizing the signal values obtained in X-raying the set of test objects with respect to said background signals to determine calibration constants, and*

*means for recognizing the material by determining a radiographic reflex for the inspected object based on the recorded radiation normalized with respect to said background signals, and accounting for said calibration constants.*

*14. The X-ray radiographic apparatus for recognition of materials in an inspected object according to claim 13, further comprising means for movement of the inspected object, wherein:*

*the means for transmitting radiation through the inspected objected in a plurality of different spectral ranges comprises an X-ray emitter equipped by at least two monochromatic filters; and*

*the means for recording said radiation transmitted through the inspected objected and the means for recognizing the materials in the inspected object collectively comprise an X-ray radiation receiver comprising at least two spatially separated selectively sensitive detector arrays, random access memory, analog-to-digital converters, and video control device, wherein the at least two spatially separated selectively sensitive detector arrays*

*have outputs connected to a joint analog-to-digital converter comprising a logarithmator with an output connected to a computer interface via software.*

*15. The apparatus of claim 14, wherein detectors of said selectively sensitive detector arrays for the energy range up to 20 keV are made of scintillators with effective atomic number below 25 and density less than 2.5 g/cm$^3$, detectors for the energy range 20-45 keV are made up of scintillators with atomic number 25-45 and density 3-6 g/cm$^3$, and detectors for the energy range 45-200 keV are made of scintillators with atomic number 45-80 and density not less than 6 g/cm$^3$.*

*16. The apparatus of claim 15, wherein a thickness of said detectors is optimized for absorption of 70-90% of the incident radiation energy.*

*17. The apparatus of claim 15, wherein detectors of said selectively sensitive detector arrays for the energy range up to 20 keV are made of scintillators selected from the group consisting of p-terphenyl, silicon, germanium, ZnSe, ZnSe (Al,O), and ZnSe(O).*

*18. The apparatus of claim 15, wherein detectors of said selectively sensitive detector arrays for the energy range 20-45 keV are made of scintillators selected from the group consisting of $A^2B^6$ compounds CdS(Te), and ZnSe(Te,O), and transparent ceramics $Gd_2O_2S$ and ZnS.*

*19. The apparatus of claim 15, wherein detectors of said selectively sensitive detector arrays for the energy range 45-20 keV are made of scintillators selected from the group consisting of crystals CdTe, CsI(Tl), XWO, BGO, LSO and LPS.*

*20. The apparatus of claim 15, wherein detectors of said selectively sensitive detector arrays for the energy range up to 20 keV are made of crystal ZnSe(Al,O) of thickness up to 0.5 mm, detectors for the energy range 20-45 keV are made of crystal ZnSe(Te) of thickness up to 1.2 mm, and detectors for the energy range 45-200 keV are made of crystal CsI(Tl) of thickness up to 2 mm.*

* * * * *